US008650185B1

(12) United States Patent
Spevacek

(10) Patent No.: US 8,650,185 B1
(45) Date of Patent: Feb. 11, 2014

(54) SYSTEMS AND METHODS FOR DATABASE INTERACTION USING A MULTI-DIMENSIONAL GRAPHICAL USER INPUT INTERFACE

(71) Applicant: Ampersand Ventures Inc., Chicago, IL (US)

(72) Inventor: Peter Spevacek, Chicago, IL (US)

(73) Assignee: Ampersand Ventures, Inc., Chicago, IL (US)

( * ) Notice: Subject to any disclaimer, the term of this patent is extended or adjusted under 35 U.S.C. 154(b) by 0 days.

(21) Appl. No.: 13/630,170

(22) Filed: Sep. 28, 2012

(51) Int. Cl.
*G06F 7/00* (2006.01)
*G06F 17/30* (2006.01)

(52) U.S. Cl.
USPC ............................ 707/722; 707/705; 707/802

(58) Field of Classification Search
None
See application file for complete search history.

(56) References Cited

U.S. PATENT DOCUMENTS

| | | | |
|---|---|---|---|
| 6,366,922 B1 * | 4/2002 | Althoff | 707/706 |
| 8,024,329 B1 * | 9/2011 | Rennison | 707/723 |
| 8,099,683 B2 | 1/2012 | Garbow et al. | |
| 8,359,537 B2 * | 1/2013 | Lyons et al. | 715/723 |
| 2004/0153355 A1 | 8/2004 | Deering et al. | |
| 2007/0247682 A2 * | 10/2007 | Kil et al. | 358/537 |
| 2008/0208907 A1 * | 8/2008 | Tolve et al. | 707/104.1 |
| 2008/0275904 A1 * | 11/2008 | Breebaart et al. | 707/102 |
| 2009/0125796 A1 | 5/2009 | Day et al. | |
| 2009/0138450 A1 * | 5/2009 | Richardson | 707/3 |
| 2009/0187580 A1 | 7/2009 | Schirmer et al. | |
| 2010/0145681 A1 * | 6/2010 | Begel | 704/200.1 |
| 2010/0185712 A1 | 7/2010 | Hawn et al. | |
| 2010/0293135 A1 * | 11/2010 | Candea et al. | 707/602 |
| 2011/0153548 A1 * | 6/2011 | Varghese et al. | 707/601 |
| 2011/0167014 A1 * | 7/2011 | Zhang et al. | 705/347 |
| 2011/0178940 A1 * | 7/2011 | Kelly et al. | 705/321 |
| 2011/0218767 A1 * | 9/2011 | Eggeling et al. | 702/180 |
| 2011/0320242 A1 | 12/2011 | Cohen | |
| 2012/0096675 A1 * | 4/2012 | Tracy et al. | 16/223 |
| 2012/0158700 A1 * | 6/2012 | Dodson et al. | 707/722 |
| 2012/0185777 A1 | 7/2012 | Banerjee | |
| 2012/0316962 A1 * | 12/2012 | Rathod | 705/14.54 |
| 2013/0030982 A1 * | 1/2013 | Sofianos | 705/37 |

FOREIGN PATENT DOCUMENTS

| | | |
|---|---|---|
| JP | 1320583 A | 12/1989 |
| WO | 2010011652 A1 | 1/2010 |

* cited by examiner

*Primary Examiner* — Wilson Lee
*Assistant Examiner* — Jessica N Le
(74) *Attorney, Agent, or Firm* — Neal, Gerber & Eisenberg LLP

(57) ABSTRACT

Systems and methods are provided for facilitating interaction with a database using a multi-dimensional graphical user input interface. According to certain aspects, the graphical user input interface may include a graphical control element manipulable to positions in a construct defined by the dimensions of the graphical user input interface. Quantifiable factors may correspond to each of the dimensions. The position of the graphical control element may be received and simultaneously define values for each of the factors. A database action may be executed based on the values. A database result may be generated and transmitted, based on the database action. The systems and methods may be utilized to simultaneously define multiple measureable factors to generate database results. Applications for the graphical user input interface include creating job descriptions, sorting and filtering datasets, searching product inventory, human resources, and survey answer collection.

16 Claims, 10 Drawing Sheets

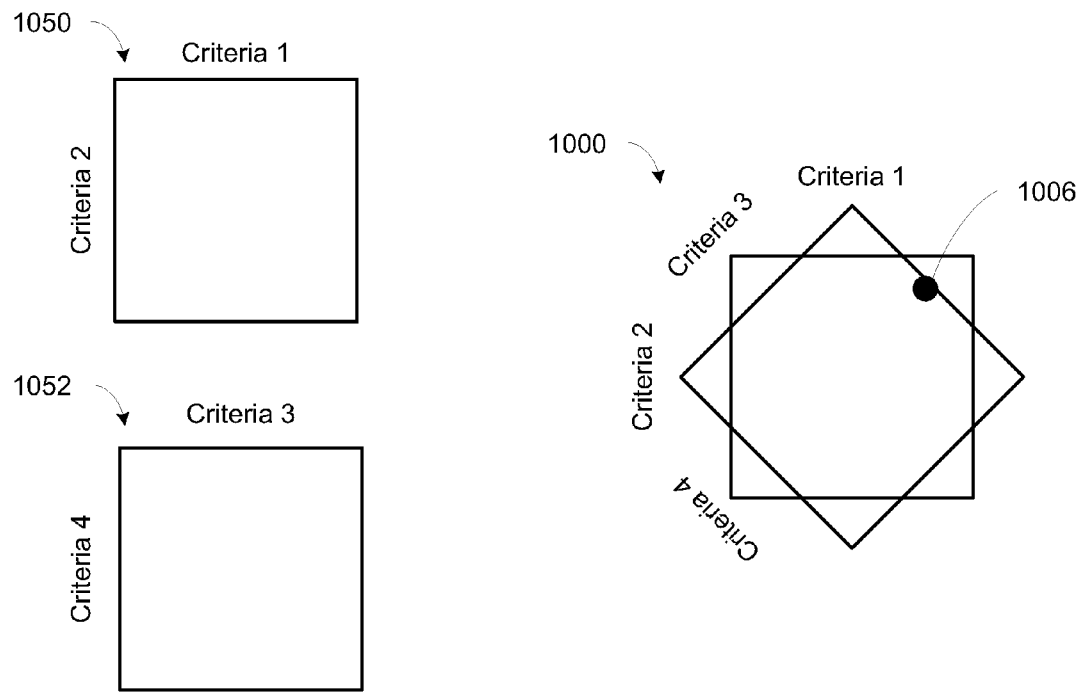
FIG. 10
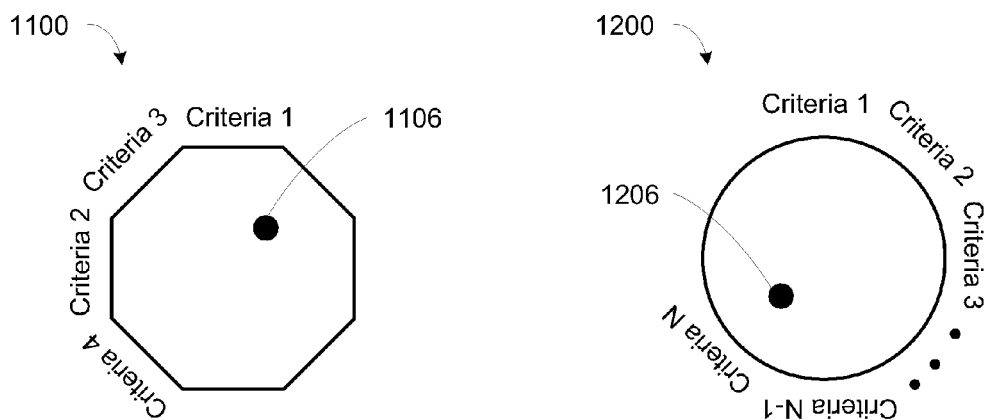
FIG. 11
FIG. 12

SYSTEMS AND METHODS FOR DATABASE INTERACTION USING A MULTI-DIMENSIONAL GRAPHICAL USER INPUT INTERFACE

FIELD

This application generally relates to user interaction with a database using a multi-dimensional graphical user input interface. In particular, the application relates to facilitating the simultaneous definition of multiple measurable factors to generate database results using a graphical control element that is manipulable in a construct of a graphical user input interface.

BACKGROUND

Users interact with computers through user interfaces that include information presented to the user, such as graphics and text on displays, and control sequences employed by the user to control the computer, such as through keyboard keystrokes, mouse movements and button clicks, and selecting objects on a touchscreen display. Computers are often utilized to enter information and/or perform tasks, including defining factors for various tasks (e.g., creating job listings, defining work responsibilities, performing workplace evaluations, etc.), sorting and filtering through large datasets (e.g., browsing and searching through product inventory), and answering surveys and polls.

Traditional techniques for entering information and performing tasks on computers may include filling out forms with input elements (e.g., fields, radio buttons, check boxes, and the like); drilling down through category hierarchies; and utilizing linear sliders to define factors. Each of these techniques may require supplementary explanations to describe how the technique will be used. For example, for creating a job listing, multiple linear sliders could be used to define the roles and responsibilities for the job. Since each linear slider is separate from the other linear sliders, it may not be easily discernable to the user how the linear sliders relate to each other. Users may need to interpret supplementary explanations to determine how much weight each linear slider may have on creating the job listing. Accordingly, the linear sliders (or the input elements, in the case of forms) cannot be simultaneously compared or weighted in relation to each other, and the user does not clearly know the relationships between the sliders (or the input elements).

Users may get frustrated with traditional techniques for entering information and performing tasks such that the users abandon the form or do not utilize the sliders, for example. This may be the case when the form or sliders take up more than one screen and the users do not wish to spend the time and effort to scroll the screen. In addition, many traditional forms are sequential in nature, may not be optimally laid out for user interaction, and may require many steps to complete. In particular, the sequential presentation and layout of input elements or sliders can prejudice how the user inputs the information.

Furthermore, it may not be intuitive to the user as to how such techniques can be used, particularly in cases where a large amount of information is presented to the user at the same time. For example, users may wish to browse, search, and/or filter through a large product inventory to find products they are interested in. Although products can be sorted into categories, the user may need to explore through several categories and subcategories to reach the products they are interested in. The user may not be able to accomplish this in a quick and easy way, which could reduce user satisfaction. In this case, the user may abandon their effort to search for products, which could result in a lost sales opportunity.

Accordingly, there is an opportunity for systems and methods that address these concerns. More particularly, there is an opportunity for systems and methods that facilitate user interaction with a database using a multi-dimensional graphical user input interface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 10 illustrates an alternative exemplary embodiment of a graphical user input interface.

FIG. 11 illustrates another alternative exemplary embodiment of a graphical user input interface.

FIG. 12 illustrates a further alternative exemplary embodiment of a graphical user input interface.

DETAILED DESCRIPTION

Figure 1:
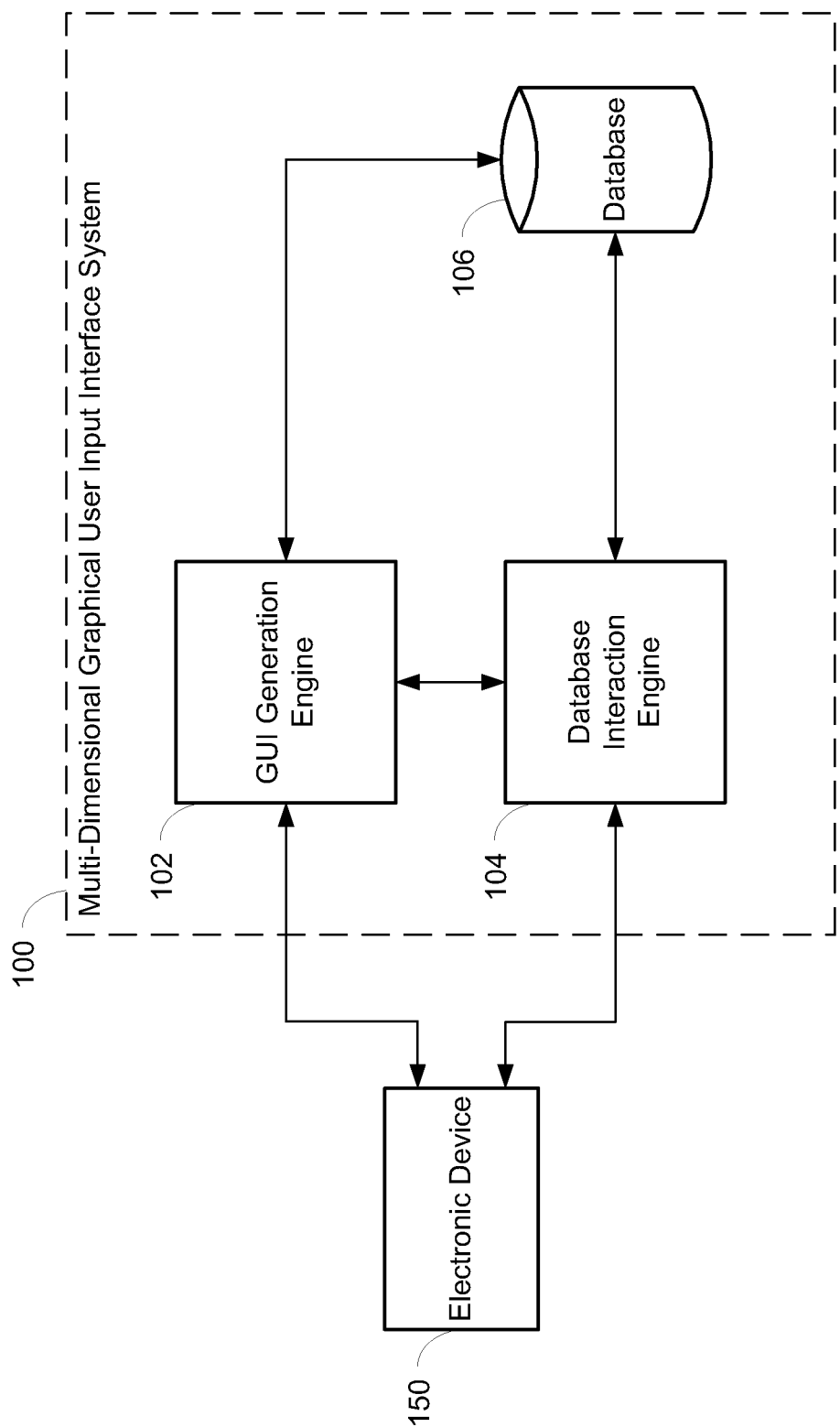
FIG. 1 is a block diagram illustrating a system for facilitating user interaction with a database using a multi-dimensional graphical user input interface.

Systems and methods are disclosed for facilitating interaction with a database using a multi-dimensional graphical user input interface. According to one embodiment, a method for interacting with a database may include transmitting to an electronic device graphical user input interface screen data for generating a graphical user input interface having a plurality of dimensions that respectively correspond to each of a plurality of factors. The graphical user input interface may include a graphical control element that is manipulable to a plurality of positions in a construct that is defined in the graphical user input interface by the plurality of dimensions.

A selected position of the graphical control element may be received from the electronic device. The selected position may represent a value for each of the plurality of factors. A database action may be executed based on the value for each of the plurality of factors, in response to receiving the selected position. The database action may include querying the database using the values, receiving data from the database based on the values, and/or writing the values to the database. A database result may be generated, in response to executing the database action, and the database result may be transmitted, in response to generating the database result.

According to another embodiment, a system for user interaction with a database may include a processor in communication with a network and a memory in communication with the processor. The memory may include a database with a plurality of factors. The memory may also include a GUI generation engine for transmitting to an electronic device graphical user input interface screen data for generating a graphical user input interface having a plurality of dimensions that respectively correspond to each of a plurality of factors. The graphical user input interface may include a graphical control element that is manipulable to a plurality of positions in a construct that is defined in the graphical user input interface by the plurality of dimensions. The GUI generation engine may receive a selected position of the graphical control element from the electronic device. The selected position may represent a value for each of the plurality of factors. A database interaction engine may execute a database action based on the value for each of the plurality of factors, in response to receiving the selected position. The database action may include querying the database using the values, receiving data from the database based on the values, and/or writing the values to the database. The database interaction engine may also generate a database result, in response to executing the database action, and transmit the database result, in response to generating the database result.

The systems and methods as discussed herein can offer improvements to existing technologies. In particular, a user can manipulate a graphical control element in a multi-dimensional graphical user input interface so that multiple factors can be simultaneously quantified, even if the factors are disparate. Each factor can be quantified not only as to itself but in relation to other factors. The importance, weight, and significance of each factor can therefore be concurrently selected by the user without need for supplementary explanation from the system or by the user. User input may be eased by using the graphical user input interface, resulting in quicker and more obvious information collection along with increased user satisfaction. Furthermore, the graphical user input interface may display visual information, such as product graphic elements, to assist the user in manipulating the graphical control element to make a selection. The visual information may be used to show the relationship between different values for a particular factor, and/or the relationship between different factors.

Applications for the graphical user input interface include, without limitation, human resources functions, job description generation for defining roles and responsibilities for a job position, creating help wanted advertisements, sorting and filtering through large datasets, easing searching and browsing of product inventories, collecting job interview evaluation answers from interviewers, collecting job performance reviews from evaluators, collecting personality traits, collecting opinion survey answers, collecting customer satisfaction survey answers, measuring personal moods, collecting medical information from patients and doctors, and collecting financial information. By utilizing the graphical user input interface, a user can therefore reduce the number of steps and/or screens for entering information or performing tasks. It should be appreciated that other benefits and efficiencies are envisioned.

Figure 2:
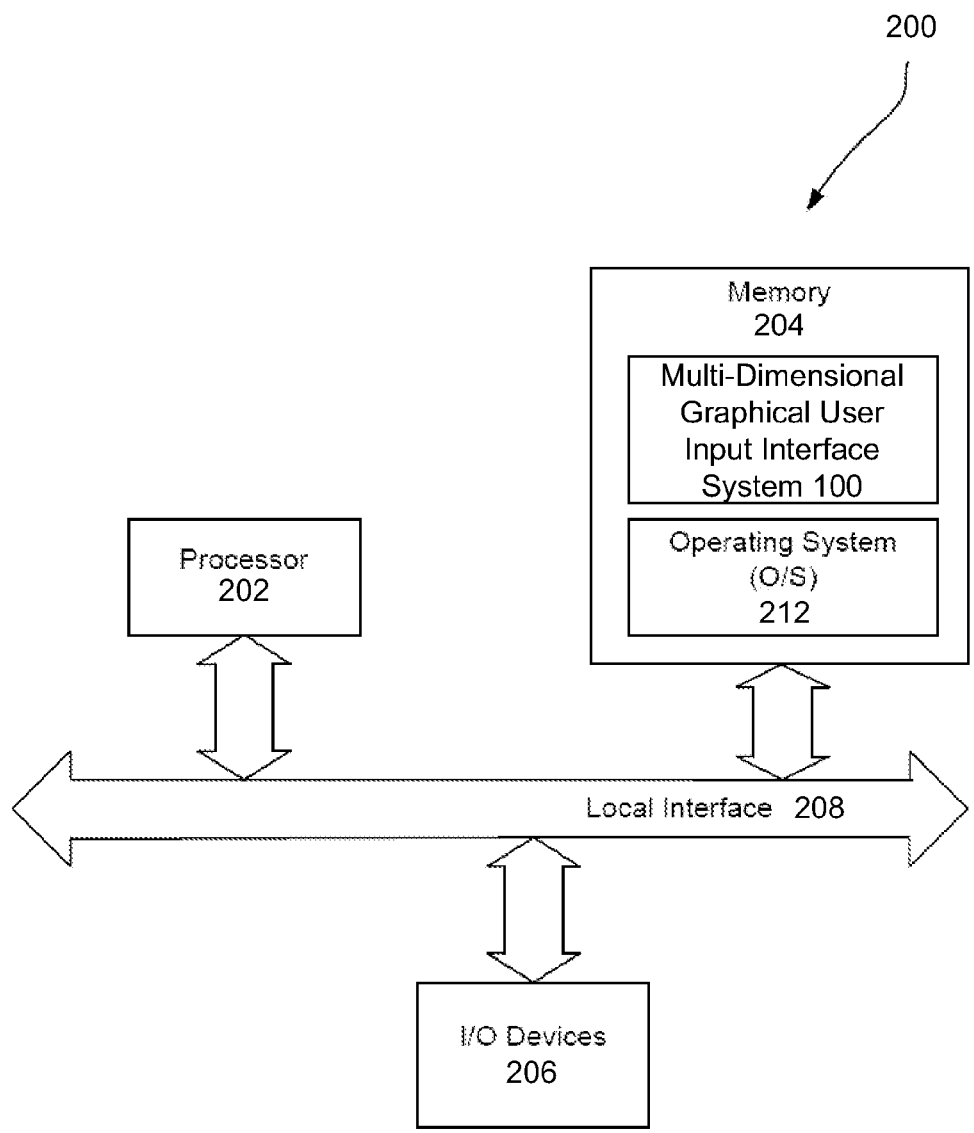
FIG. 2 is a block diagram of one form of a computer or server of FIG. 1, having a memory element with a computer readable medium for implementing the system of FIG. 1.

FIG. 1 illustrates a multi-dimensional graphical user input interface system 100 for facilitating user interaction with a database that utilizes a manipulable graphical control element in a graphical user input interface, in accordance with one or more principles of the invention. The system 100 may generate and transmit a database result, such as a job description, a listing of product inventory, changing or not changing a product graphic element, storing survey results, and/or other information. The database result may be generated in response to the execution of a database action that is based on values for a plurality of factors that have been selected by a user using an electronic device 150 via a graphical user input interface. The graphical user input interface may include a graphical control element that is manipulable by the user to simultaneously quantify the values of the factors. Various components of the system 100 may be implemented using software executable by one or more servers or computers, such as a computing device 200 with a processor 202 and memory 204 as shown in FIG. 2, which is described in more detail below.

An electronic device 150 may communicate with a GUI generation engine 102 and a database interaction engine 104 in the system 100. The electronic device 150 may be, for example, a smartphone, a cellular phone, a personal digital assistant, a tablet computer, a laptop computer, or the like. In one embodiment, applications executing on the electronic device 150 may facilitate communication with the system 100. The application may include a web browser, a specific application for communicating with the system 100, or another type of application.

Graphical user input interface screen data may be generated by the GUI generation engine 102 and be transmitted to the electronic device 150. The graphical user input interface screen data may be for generating some or all of a graphical user input interface. The graphical user input interface may have multiple dimensions that respectively correspond to multiple factors that a user can quantify. The graphical user input interface may include a graphical control element that is manipulable by the user to one or more positions in a construct defined by the dimensions of the graphical user input interface. A location of the graphical control element may be received by the GUI generation engine 102 when the graphical control element is positioned in the graphical user input interface. The location may be specified as a coordinate (e.g., x-y coordinate, etc.), a grid location (e.g., row-column, alphanumeric grid, etc.), or using other location identifiers. Exemplary graphical user input interfaces 300, 400, 500, 1000, 1100, and 1200 are respectively shown in FIGS. 3A-3C, 4A-4C, 5A-5C, 10, 11, and 12. In the exemplary graphical user input interfaces, the graphical control elements 306, 406, 506, 1006, 1106, and 1206 are illustrated as a ball that can be manipulated by the user to any position in the construct defined by the respective axes shown in each figure. As described in more detail below, when a graphical control element is placed at a particular position, the multiple factors corresponding to the axes can be simultaneously quantified. The graphical control elements may also be shown as a point, square, triangle, or any other shape or indicator that can be manipulated by a user in the graphical user input interface. The graphical control elements may be placed in any position in the construct defined by the graphical user input interface.

It should be noted that graphical user input interface screen data may include data for generating graphics, text, animation, audio, and/or other elements on one or more graphical user input interfaces. For example, elements of graphical user input interfaces can include, without limitation, a graphical control element, labels, and/or product graphic elements. The system 100 (and the GUI generation engine 102) may or may not transmit graphical user input interface screen data for generating some or all of the elements of a particular graphical user input interface to the electronic device 150 at a given time. The electronic device 150 may store in a cache, memory, and/or other storage medium some or all of the graphical user input interface screen data previously transmitted from the system 100, for example. In this case, the electronic device 150 may utilize this stored graphical user input interface screen data and/or graphical user input interface screen data subsequently transmitted from the system 100 for generating a graphical user input interface. As an example, the system 100 may initially transmit to the electronic device 150 graphical user input interface screen data for generating the labels, the graphic elements of the x-axis and y-axis, and the graphical control element of the graphical user input interface 300. This graphical user input interface screen data may be stored in a data cache on the electronic device 150. If a subsequent graphical user input interface is to be displayed with different labels, the electronic device 150 may utilize the stored graphical user input interface screen data from the cache for the graphic elements of the x-axis and y-axis and the graphical control element. The graphical user input interface screen data for generating the different labels can be transmitted by the system 100 to the electronic device 150.

The GUI generation engine 102 may generate the graphical user input interface screen data for generating some or all of the graphical user input interface, based on multiple factors retrieved from a database 106 and/or from an external source. Although a single database 106 is illustrated in FIG. 1 for simplicity, it is possible and contemplated that multiple databases could be utilized that are available to all users and/or specific to a particular user. Accordingly, the factors may be generic or specific to a particular user. The database 106 may have been previously loaded with the factors, in some embodiments. The factors used may depend on the application of the graphical user input interface. For example, if the graphical user input interface is used for generating job descriptions, the factors may include job type, restaurant classification, specific skills, prior experience, physical ability requirements, specific task requirements, and/or other factors. As another example, if the graphical user input interface is used for searching and browsing product inventory, the factors may include price, categories and sub-categories (e.g., brand, type, material, color, etc.), availability, format, and/or other factors. As a further example, if the graphical user input interface is used for collecting job performance review answers, the factors may include attendance, adaptability, initiative, communication skills, knowledge skills, organization skills, decision making skills, productivity metrics, time management skills, teamwork skills, and/or other factors.

The factors can also be used as labels in the graphical user input interface, in some embodiments. For example, in FIGS. 3A-3C, the graphical user input interface 300 is related to generating a job description for a restaurant job position. The axis 302 in the y-dimension includes a job type factor that ranges from a busboy to a dishwasher. The axis 304 in the x-dimension includes a restaurant classification factor that ranges from fine dining to casual dining. The labels busboy, dishwasher, fine dining, and casual dining may be listed as the extremes of the factors on the graphical user input interface 300. Labels for the factors may include text, graphics, animation, audio, and/or other information.

Each of these factors does not necessarily have inherent discrete objective levels in their respective ranges, but instead the ranges may have a subjective component. For example, when a user manipulates the graphical control element 306 to a particular position, such as in FIG. 3A, the user is quantifying that the job position is generally more a busboy position with possible dishwasher responsibilities at a restaurant that is classified more as fine dining than casual dining. This is because the graphical control element 306 is not positioned at the extremes of the axes 302 and 304. In contrast, when a user manipulates the graphical control element 306 to another position, such as in FIG. 3B, the user is quantifying that the job position is a dishwasher position at a fine dining restaurant. In this case, the graphical control element 306 is positioned at the bottom and left extremes of the axes 302 and 304, respectively. In FIG. 3C, the graphical control element 306 is positioned such that the user is quantifying the job position as generally more a busboy position with possible dishwasher responsibilities at a restaurant that is classified more as casual dining than fine dining.

Figure 4A:
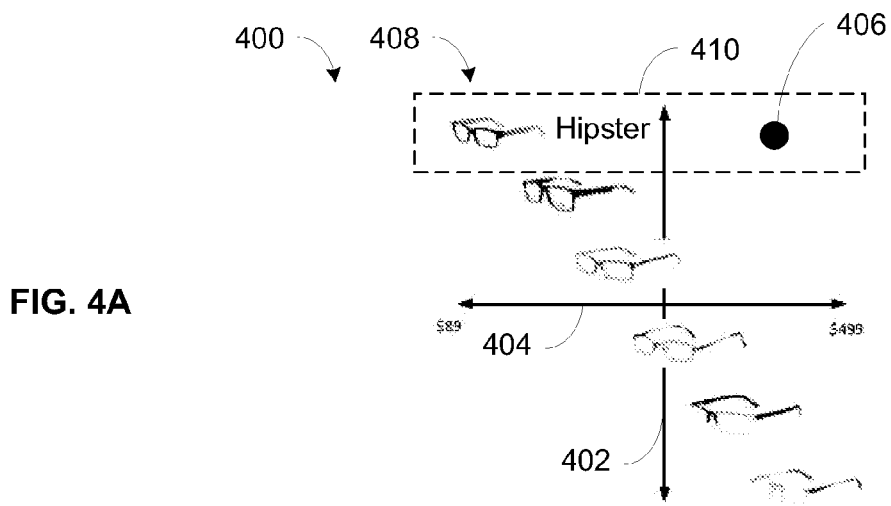
FIGS. 4A-4C illustrate exemplary embodiments of a graphical user input interface for sorting through and filtering a product inventory.
Figure 4B:
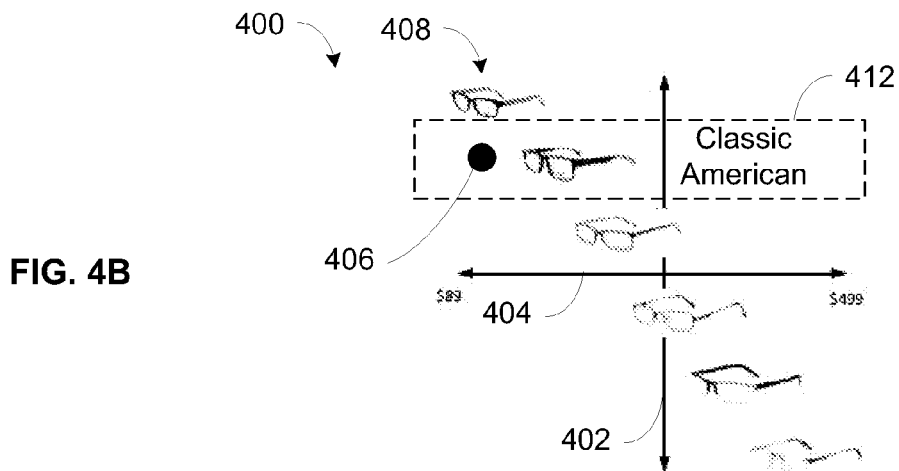
Figure 4C:
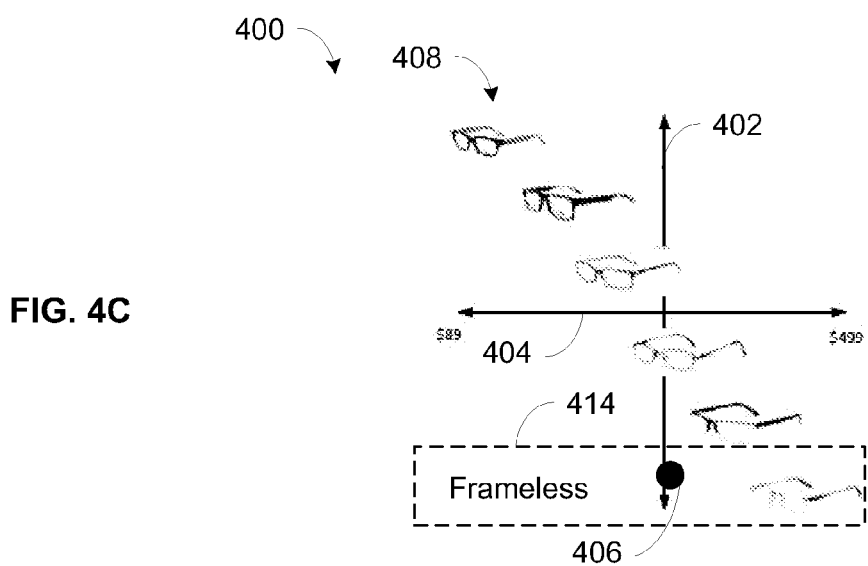

In some embodiments, product graphic elements may be displayed by the GUI generation engine 102 on the graphical user input interface in addition to or in lieu of labels for the factors. For example, in FIGS. 4A-4C, the graphical user input interface 400 is related to transmitting a listing of a portion of a product inventory for eyeglasses. The axis 402 in the y-dimension includes an eyeglasses category factor ranging from hipster to frameless that are shown as product graphic elements 408. It should be noted that there is no inherent relationship or continuum between the different categories of eyeglasses shown. As such, showing the eyeglasses as product graphic elements 408 is advantageous to the user so that the user can see an example of what the eyeglass category includes. The axis 404 in the x-dimension includes a price factor that ranges from $89 to $499 with corresponding labels. It should be noted that the arrangement of the product graphic elements 408 in FIGS. 4A-4C does not necessarily indicate that the corresponding products (e.g., the particular eyeglasses category) is only available at the price range or price point indicated on the axis 404. The product graphic elements 408 can be arranged as shown in FIGS. 4A-4C or in other arrangements. For example, each of the product graphic elements 408 can be placed vertically above and below one another on the axis 402.

Figure 3A:
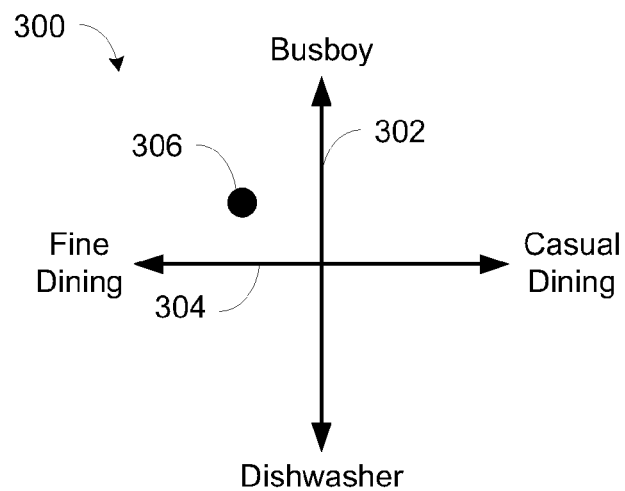
FIGS. 3A-3C illustrate exemplary embodiments of a graphical user input interface for generating job descriptions.
Figure 3B:
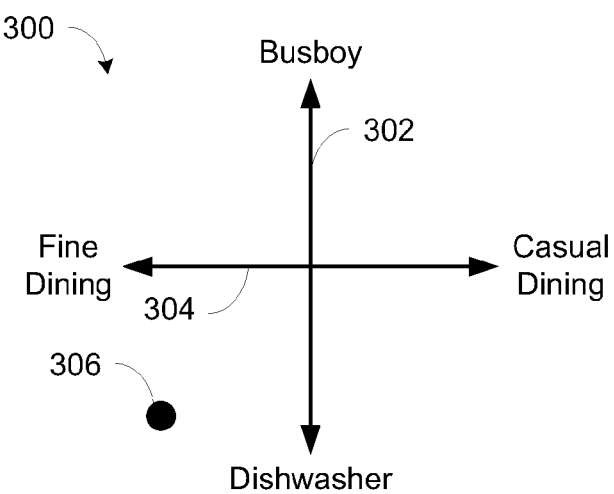
Figure 3C:
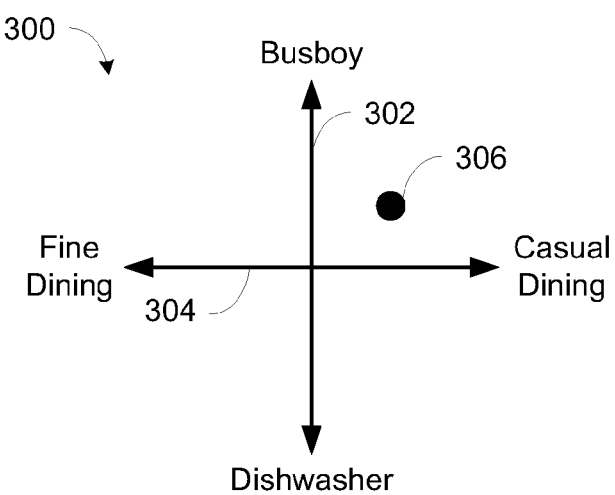

In contrast to the graphical user input interface 300 described with respect to FIGS. 3A-3C, each of the factors utilized in FIGS. 4A-4C have more discrete objective levels in their respective ranges. For example, when a user manipulates the graphical control element 406 to the position shown in FIG. 4A, the user is quantifying that they desire to retrieve eyeglasses product listings that are expensive (e.g., not quite $499) and in the hipster category. This is because the graphical control element 406 is not placed at the extreme of the axis 404, and is placed within the hipster category on the axis 402. When the user manipulates the graphical control element 406 to the position shown in FIG. 4B, the user is quantifying that they desire to retrieve eyeglasses product listings that are inexpensive (e.g., $89) and in the classic American category. In this case, the graphical control element 406 is placed at the left extreme of the axis 404 but within the classic American category on the axis 402. In FIG. 4C, the graphical control element 406 is positioned such that the user is quantifying the desire to retrieve eyeglasses product listings that are in a mid-range price (e.g., approximately $200) and in the frameless category.

Figure 5A:
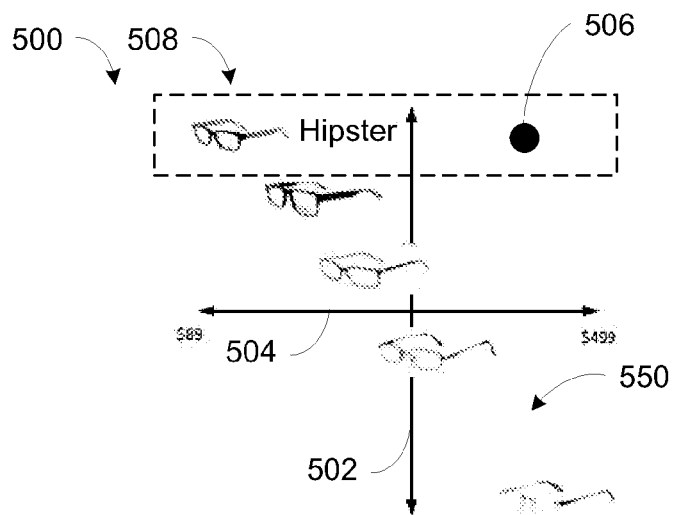
FIGS. 5A-5C illustrate alternative exemplary embodiments of a graphical user input interface for sorting through and filtering a product inventory.
Figure 5B:
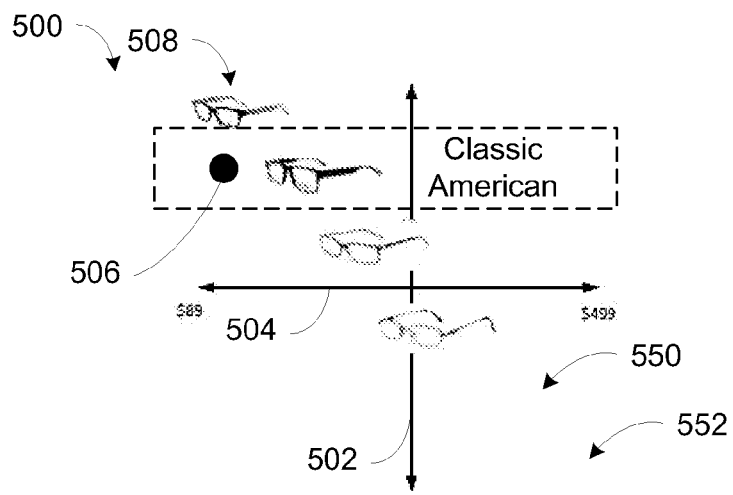

In certain embodiments, the GUI generation engine 102 can add, remove, or not change one or more of the product graphic elements after the graphical control element is positioned. For example, in FIGS. 5A-5C, the graphical user input interface 500 is related to transmitting a listing of a product inventory for eyeglasses, similar to the graphical user input interface 400 shown in FIGS. 4A-4C. The axis 502 in the y-dimension includes an eyeglasses category factor ranging from hipster to frameless that are shown as product graphic elements 508. The axis 504 in the x-dimension includes a price factor that ranges from $89 to $499. In FIG. 5A, the graphical control element 506 is positioned such that relatively expensive eyeglasses in the hipster category will be retrieved. The product graphic element for semi-rimless eyeglasses has been removed from the location 550 of the graphical user input interface 500 because no eyeglasses in that category are available at that price. In FIG. 5B, the graphical control element 506 is positioned such that inexpensive eyeglasses in the classic American category will be retrieved. The product graphic elements for semi-rimless eyeglasses and frameless eyeglasses have been removed from locations 550 and 552 of the graphical user input interface 500 because no eyeglasses in those categories are available at that price. Finally, at FIG. 5C, the graphical control element 506 is positioned such that mid-range price eyeglasses in the frameless category will be retrieved. The product graphic element for classic American eyeglasses has been removed from the location 554 of the graphical user input interface 500 because no eyeglasses in that category are available at that price.

In some embodiments, the GUI generation engine 102 can also transmit graphical user input interface screen data for generating more than one graphical user input interface to the electronic device 150, in the case where it is desired to have the user select between more factors than can be shown in the dimensions of a single graphical user input interface. As described in more detail below, a database interaction engine 104 can transmit a list of the factors to the electronic device 150. The user can select a subset of the factors that the user wishes to quantify. The database interaction engine 104 may receive the subset of the factors from the electronic device 150. In this case, the GUI generation engine 102 may transmit graphical user input interface screen data for generating multiple graphical user input interfaces that each includes a portion of the subset of the factors. The graphical user input interface screen data for generating the multiple graphical user input interfaces may be transmitted serially or simultaneously. As an example, FIGS. 3A-3C show a graphical user input interface 300 related to generating a job description for a restaurant job position. The factors in this graphical user input interface 300 are a job type factor ranging from a busboy to a dishwasher, and a restaurant classification factor that ranges from fine dining to casual dining. If the user desires to define more roles and responsibilities for the job position, graphical user input interface screen data for generating additional graphical user input interfaces with more factors could be transmitted to the electronic device 150. In this example, additional factors could include experience level (e.g., with time ranges, number of previous relevant job ranges, etc.), customer contact (e.g., ranging from no contact to much contact), language skills (e.g., English proficiency ranges, writing proficiency ranges, etc.), and/or other factors.

Although graphical user input interfaces in the examples above have been described with two dimensions and two corresponding factors, the GUI generation engine 102 may transmit to the electronic device 150 graphical user input interface screen data for generating graphical user input interfaces with any number of dimensions and corresponding factors. For example, in FIG. 10, a graphical user input interface 1000 is shown that includes four dimensions with four corresponding factors (listed as Criteria 1, Criteria 2, Criteria 3, and Criteria 4) and two square shapes. The graphical user input interface 1000 may be composed of two separate graphical user input interfaces 1050 and 1052 that are generated as square shapes. The graphical user input interface 1050 may include the factors Criteria 1 and Criteria 2, and the graphical user input interface 1052 may include the factors Criteria 3 and Criteria 4. Although shown as square shapes, the graphical user input interfaces 1050 and 1052 could individually be utilized in a similar fashion as the graphical user input interface 300 with two dimensions, as described above. Graphical user input interface screen data for generating the graphical user input interface 1000 can be transmitted by the GUI generation engine 102 as two square shapes with the graphical user input interface 152 component rotated slightly counterclockwise. As seen in FIG. 10, a graphical control element 1006 is placed such that there is simultaneous quantification of all of the four factors.

As another example, FIG. 11 shows a graphical user input interface 1100 that also includes four dimensions with four corresponding factors (listed as Criteria 1, Criteria 2, Criteria 3, and Criteria 4). In this case, graphical user input interface screen data for generating the graphical user input interface 1100 is transmitted by the GUI generation engine 102 to the electronic device 150 as an octagon shape such that the placement of the graphical control element 1106 also simultaneously quantifies all of the four factors. As a further example, FIG. 12 illustrates a graphical user input interface 1200 with N dimensions and N corresponding factors (listed as Criteria 1, Criteria 2, and Criteria 3 through Criteria N−1 and Criteria N). The GUI generation engine 120 may transmit graphical user input interface screen data for generating the graphical user input interface 1200 to the electronic device 150 as a circle shape such that the placement of the graphical control element 1206 simultaneously quantifies all of the N factors. Other shapes with corresponding dimensions and factors for a graphical user input interface are possible and contemplated.

Figure 13:
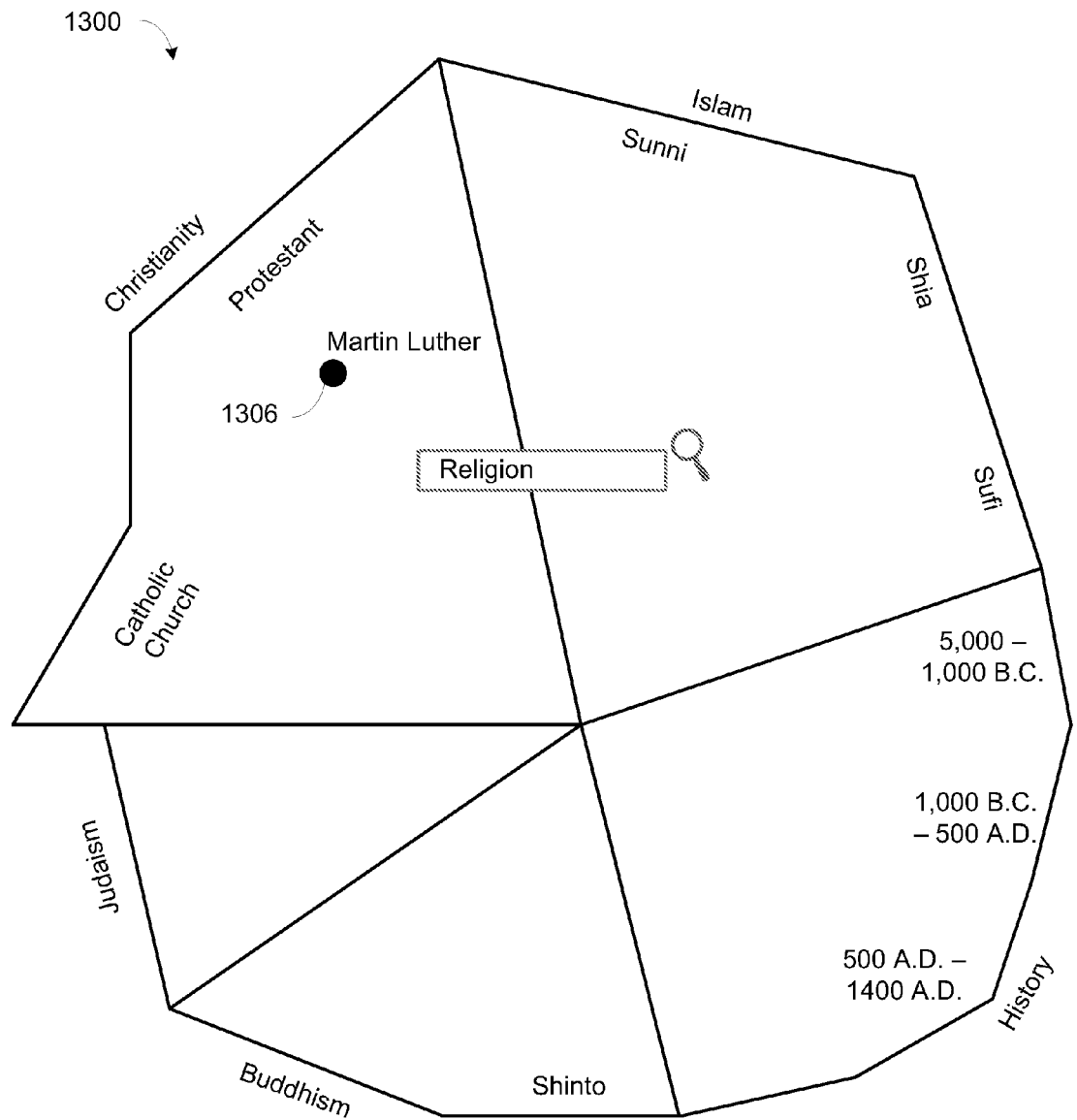
FIG. 13 illustrates another alternative exemplary embodiment of a graphical user input interface.

In one embodiment, a graphical user input interface may be configured to interface with a text input field for producing improved faceted search results. For example, FIG. 13 shows a graphical user input interface 1300 that includes multiple dimensions and shapes that correspond to multiple categories and sub-categories. The graphical user input interface 1300 can be generated due to a search for the term "Religion". Because the topic of religion is generally broad, a user can interact with the graphical control element 1306 in the graphical user input interface 1300 to more quickly narrow down the search results the user wishes to retrieve. In FIG. 3, the graphical control element 1306 is placed such that the user desires to find subject matter more related to the Protestant religion in Christianity, and in particular, to Martin Luther. The placement of the graphical control element 1306 simultaneously indicates that the user is less interested in subject matter related to the history of religion, Judaism, Buddhism, etc. Each of the labels on the graphical user input interface 1300 can be derived from a taxonomy drawn from a database. The shape of the graphical user input interface 1300 can indicate the depth, quantity, and/or availability of the search results for a particular category or sub-category. In some embodiments, the user can interact with the graphical user input interface 1300 to zoom in for greater detail, zoom out for less detail, scroll, slide, and/or rotate the graphical user input interface 1300 in three dimensions.

A database interaction engine 104 may be in communication with the electronic device 150, the GUI generation engine 102, and the database 106. A database action may be executed by the database interaction engine 104 based on the values for each of the factors quantified by the position of the graphical control element in the graphical user input interface, as described above. The database interaction engine 104 may execute the database action after the selected position of the graphical control element is received by the GUI generation engine 102. The database action may include querying the database 106 using the value of each of the factors, receiving data from the database 106 based on the value of each of the factors, and/or writing the value for each of the factors to the database 106. Querying the database 106 may include searching for data based on the value of each of the factors, sorting the data based on the value of each of the factors, and/or filtering the data based on the value of each of the factors. The database 106 can be configured as a relational database (e.g., SQL), a NoSQL database, a schema-less database, or another type of database.

In addition to a database action, the database interaction engine 104 may also trigger ancillary actions that are not directly related to the database 106. For example, in the case of generating a job description, if the graphical control element is positioned such that the job position is primarily for a dishwasher, the user could be notified that there is a legal requirement to obtain an appropriate health certificate. As another example, if the graphical user input interface is being used to collect job performance reviews from an evaluator, the user could be automatically prompted for an explanation about a particular answer, depending on the position of the graphical control element, e.g., asking for specific descriptions if the evaluator indicated that the employee produced poor work product. The database interaction engine 104 may write such notifications to the database 106 and/or transmit the notifications to the electronic device 150, for example.

The database interaction engine 104 may also generate and transmit a database result in response to executing the database action. The database result may vary, depending on the application of the graphical user input interface. For example, the database result may include a job description, a listing of product inventory, writing values for the factors or other data to the database, transmitting values for the factors or other data from the database, or other results. The database result may also change or affect the number of dimensions, the shape, and/or the labels of a graphical user input interface. The database result can be directly or indirectly dependent on the executed database action and/or the values for the factors specified by the graphical control element in the graphical user input interface. The database result may be transmitted by the database interaction engine 104, in response to generating the database result. The database interaction engine 104 may transmit the database result to the electronic device 150, another electronic device, and/or to other entities.

In some embodiments, the database interaction engine 104 can transmit a list of possible factors to the electronic device 150, prior to the transmission of graphical user input interface screen data for generating the graphical user input interface by the GUI generation engine 102. In this case, the user of the electronic device 150 may select a subset of the factors that the user wishes to quantify in one or more graphical user input interfaces. In one embodiment, the subset of the factors may be ranked, prioritized, or unranked, depending on the importance of particular factors to the user. The subset of the factors may be received by the database interaction engine 104 from the electronic device 150. The GUI generation engine 102 may then utilize the subset of the factors to transmit graphical user input interface screen data for generating one or more graphical user input interfaces that include the subset of the factors. The order of the graphical user input interfaces could be dependent on the ranking or prioritization of the subset of the factors. In one example, a graphical user input interface includes two dimensions (and two corresponding factors). The database interaction engine 104 can retrieve a list of possible factors from the database 106 and transmit the possible factors to the electronic device 150. If the user selects six factors from the list of possible factors, then graphical user input interface screen data for generating three graphical user input interfaces would be transmitted by the GUI generation engine 102 to the electronic device 150.

FIG. 2 is a block diagram of a computing device 200 housing executable software used to facilitate the multi-dimensional graphical user input interface system 100. One or more instances of the computing device 200 may be utilized to implement any, some, or all of the components in the system 100, including the GUI generation engine 102 and the database interaction engine 104. Computing device 200 includes a memory element 204. Memory element 204 may include a computer readable medium for implementing the system 100, and for implementing particular system transactions. Memory element 204 may also be utilized to implement the database 106. Computing device 200 also contains executable software, some of which may or may not be unique to the system 100.

In some embodiments, the system 100 is implemented in software, as an executable program, and is executed by one or more special or general purpose digital computer(s), such as a mainframe computer, a personal computer (desktop, laptop or otherwise), personal digital assistant, or other handheld computing device. Therefore, computing device 200 may be representative of any computer in which the system 100 resides or partially resides.

Generally, in terms of hardware architecture as shown in FIG. 2, computing device 200 includes a processor 202, a memory 204, and one or more input and/or output (I/O) devices 206 (or peripherals) that are communicatively coupled via a local interface 208. Local interface 208 may be one or more buses or other wired or wireless connections, as is known in the art. Local interface 208 may have additional elements, which are omitted for simplicity, such as controllers, buffers (caches), drivers, transmitters, and receivers to facilitate external communications with other like or dissimilar computing devices. Further, local interface 208 may include address, control, and/or data connections to enable internal communications among the other computer components.

Processor 202 is a hardware device for executing software, particularly software stored in memory 204. Processor 202 can be any custom made or commercially available processor, such as, for example, a Core series or vPro processor made by Intel Corporation, or a Phenom, Athlon or Sempron processor made by Advanced Micro Devices, Inc. In the case where computing device 200 is a server, the processor may be, for example, a Xeon or Itanium processor from Intel, or an Opteron-series processor from Advanced Micro Devices, Inc. Processor 202 may also represent multiple parallel or distributed processors working in unison.

Memory 204 can include any one or a combination of volatile memory elements (e.g., random access memory (RAM, such as DRAM, SRAM, SDRAM, etc.)) and nonvolatile memory elements (e.g., ROM, hard drive, flash drive, CDROM, etc.). It may incorporate electronic, magnetic, optical, and/or other types of storage media. Memory 204 can have a distributed architecture where various components are situated remote from one another, but are still accessed by processor 202. These other components may reside on devices located elsewhere on a network or in a cloud arrangement.

The software in memory 204 may include one or more separate programs. The separate programs comprise ordered listings of executable instructions for implementing logical functions. In the example of FIG. 2, the software in memory 204 may include the system 100 in accordance with the invention, and a suitable operating system (O/S) 212. Examples of suitable commercially available operating systems 212 are Windows operating systems available from Microsoft Corporation, Mac OS X available from Apple Computer, Inc., a Unix operating system from AT&T, or a Unix-derivative such as BSD or Linux. The operating system O/S 212 will depend on the type of computing device 200. For example, if the computing device 200 is a PDA or handheld computer, the operating system 212 may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system 212 essentially controls the execution of other computer programs, such as the system 100, and provides scheduling, input-output control, file and data management, memory management, and communication control and related services.

If computing device 200 is an IBM PC compatible computer or the like, the software in memory 204 may further include a basic input output system (BIOS). The BIOS is a set of essential software routines that initialize and test hardware at startup, start operating system 212, and support the transfer of data among the hardware devices. The BIOS is stored in ROM so that the BIOS can be executed when computing device 200 is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, and Lua. Components of the system 100 may also be written in a proprietary language developed to interact with these known languages.

I/O device 206 may include input devices such as a keyboard, a mouse, a scanner, a microphone, a touch screen, a bar code reader, or an infra-red reader. It may also include output devices such as a printer, a video display, an audio speaker or headphone port or a projector. I/O device 206 may also comprise devices that communicate with inputs or outputs, such as a short-range transceiver (RFID, Bluetooth, etc.), a telephonic interface, a cellular communication port, a router, or other types of network communication equipment. I/O device 206 may be internal to computing device 200, or may be external and connected wirelessly or via connection cable, such as through a universal serial bus port.

When computing device 200 is in operation, processor 202 is configured to execute software stored within memory 204, to communicate data to and from memory 204, and to generally control operations of computing device 200 pursuant to the software. The system 100 and operating system 212, in whole or in part, may be read by processor 202, buffered within processor 202, and then executed.

In the context of this document, a "computer-readable medium" may be any means that can store, communicate, propagate, or transport data objects for use by or in connection with the system 100. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system 100 can be embodied in any type of computer-readable medium for use by or in connection with an instruction execution system or apparatus, such as a computer.

For purposes of connecting to other computing devices, computing device 200 is equipped with network communication equipment and circuitry. In an embodiment, the network communication equipment includes a network card such as an Ethernet card, or a wireless connection card. In a network environment, each of the plurality of computing devices 200 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while an embodiment of the invention is for each computing device 200 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Figure 6:
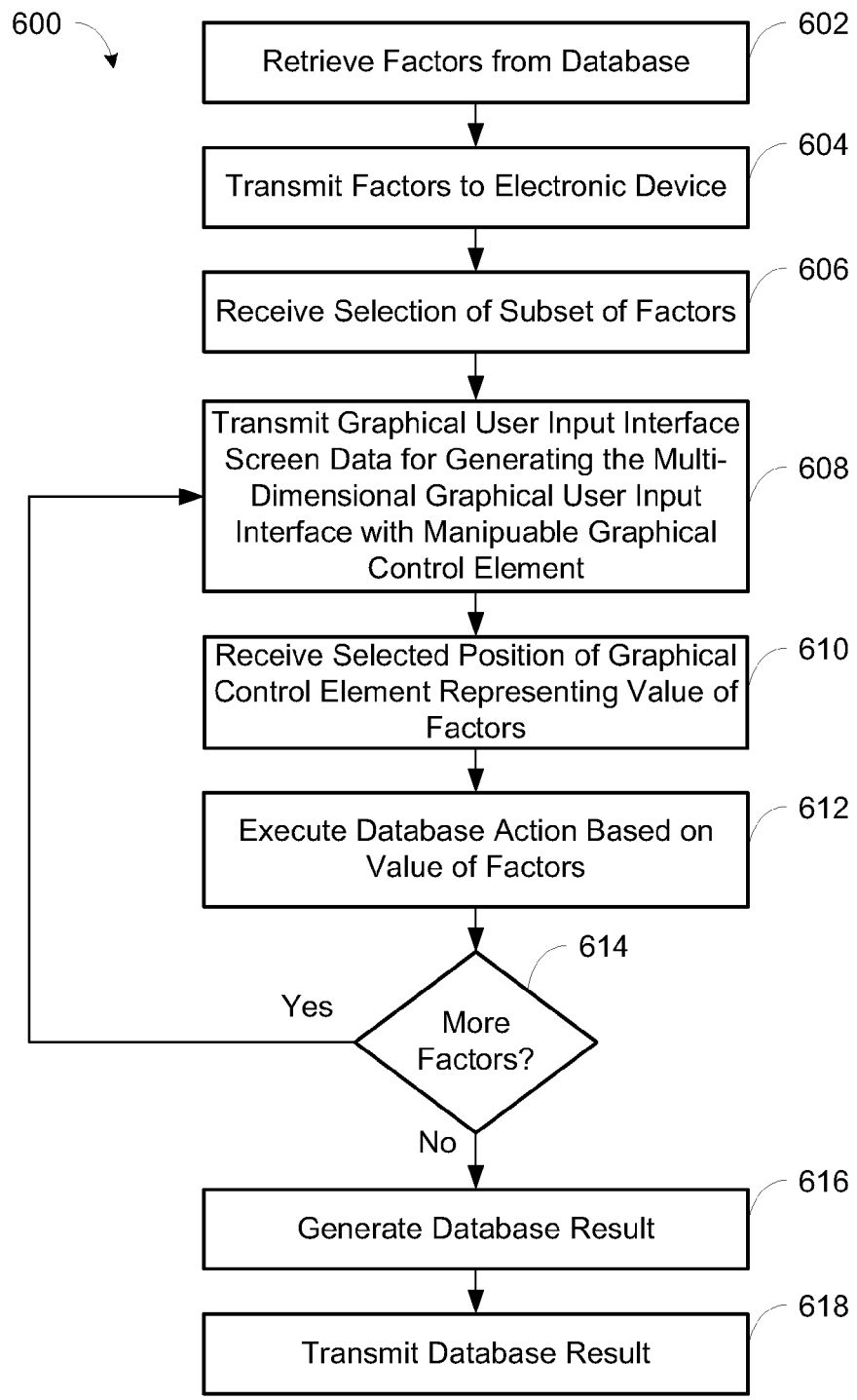
FIG. 6 is a flow diagram illustrating operations for facilitating user interaction with a database using a multi-dimensional graphical user input interface using the system of FIG. 1.

FIG. 6 is a flowchart of a method 600 for facilitating user interaction with a database 106 that utilizes a manipulable graphical control element in a multi-dimensional graphical user input interface, in accordance with one or more principles of the invention. The method 600 may utilize the system 100 and result in the generation and transmission of a database result, such as a job description, a listing of product inventory, changing or not changing a product graphic element, storing survey results, and/or other information. The database result may be generated in response to the execution of a database action that is based on values for a plurality of factors that have been selected by a user using an electronic device 150 via a graphical user input interface. The graphical user input interface may include a graphical control element that is manipulable by the user to simultaneously quantify the values of the factors.

At step 602, a list of factors may be retrieved from a database 106, such as by a database interaction engine 104. The factors may be generic or specific to an application, such as generating a job description, and may be utilized as a basis for one or more graphical user input interfaces. The list of factors can be transmitted to an electronic device 150 at step 604. A user utilizing the electronic device 150 can then select a subset (including some or all) of the factors that they wish to quantify. In one embodiment, the subset of factors may be ranked or prioritized. The selection of the subset of factors can be received at step 606. In some embodiments, steps 604 and 606 may be optional, such as in the case when all of the factors for a particular application are desired to be utilized, or if the user is not allowed to select a subset of the factors.

At step 608, graphical user input interface screen data for generating a multi-dimensional graphical user input interface may be transmitted to the electronic device 150. The graphical user input interface may be based on all of the factors retrieved at step 602, or based on the selection of the subset of factors received at step 606. A graphical control element that is manipulable by a user may also be transmitted at step 608. The graphical control element may be positioned at one or more positions in a construct defined by the dimensions of the graphical user input interface. Exemplary graphical user input interfaces 300, 400, 500, 1000, 1100, and 1200 are respectively shown in FIGS. 3A-3C, 4A-4C, 5A-5C, 10, 11, and 12. FIGS. 3A-3C illustrate a graphical user input interface 300 with two dimensions and two corresponding quantifiable factors (job type and restaurant classification). FIGS. 4A-4C and 5A-5C respectively illustrate graphical user input interfaces 400 and 500 with two dimensions and two corresponding quantifiable factors (eyeglasses category and price).

The selected position of the graphical control element in the graphical user input interface may be received at step 610. The position may be specified as a coordinate (e.g., x-y coordinate, etc.), a grid location (e.g., row-column, alpha-numeric grid, etc.), or using other location identifiers. When the position of the graphical control element is selected, the user is simultaneously quantifying values for each of the factors in the graphical user input interface. For example, in FIG. 3B, when a user manipulates the graphical control element 306 to the position at the bottom and left extremes of the axes 302 and 304, respectively, the user is quantifying that the job position is a dishwasher position at a fine dining restaurant. Although the graphical control element 306 is shown at an extreme in FIG. 3B, the graphical control element 306 may be placed anywhere in the continuums defined by the axes 302 and 304 in the graphical user input interface, as exemplified in FIGS. 3A and 3C.

A database action may be executed at step 612, based on the value of the factors quantified by the position of the graphical control element received at step 610. The database interaction engine 104 may execute the database action, for example. The database action may include querying the database 106 using the value of each of the factors, receiving data from the database 106 based on the value of each of the factors, and/or writing the value for each of the factors to the database 106. Querying the database 106 may include searching for data based on the value of each of the factors, sorting the data based on the value of each of the factors, and/or filtering the data based on the value of each of the factors. Specific implementations of step 612 for different applications are described in more detail below with respect to FIGS. 7, 8, and 9.

It may be determined at step 614 if there are more factors that need to be displayed on a graphical user input interface. This may be the case if the number of factors to be displayed is greater than the number of dimensions of the graphical user input interface, such as if the user selected a large subset of factors at step 606, or if the number of factors retrieved at step 602 is large. If there are more factors to be displayed on a graphical user input interface at step 614, then the method 600 may continue to step 608 to transmit graphical user input interface screen data for generating a graphical user input interface with the additional factors. A selected position of the graphical control element in the new graphical user input interface can be received at step 610, and a database action can be executed at step 612 based on the value of the factors quantified by the position of the graphical control element. For example, the graphical user input interface 300 of FIGS. 3A-3C includes two dimensions and two corresponding factors. If there are eight factors retrieved at step 602 for the particular application of the graphical user input interface, then graphical user input interface screen data for generating four graphical user input interfaces would be transmitted. In particular, steps 608, 610, and 612 would be executed four times in order to transmit graphical user input interface screen data for generating the graphical user input interfaces for the eight factors (i.e., each interface would have two factors), receive selected positions of the graphical control elements, and execute database actions based on the values of the factors quantified by the positions of the graphical control elements. The graphical user input interfaces may be displayed simultaneously or serially.

If no more factors are to be displayed on a graphical user input interface at step 614, then the method 600 may continue to step 616. At step 616, a database result may be generated, such as by the database interaction engine 104. The database result may vary, depending on the application of the graphical user input interface. For example, the database result may include a job description, a listing of product inventory, writing values for the factors or other data to the database, transmitting values for the factors or other data from the database, or other results. The database result may also change or affect the number of dimensions, the shape, and/or the labels of a graphical user input interface. The database result can be directly or indirectly dependent on the executed database action and/or the values for the factors specified by the graphical control element in the graphical user input interface. The database result may be transmitted at step 618 by the database interaction engine 104, in response to generating the database result. The database result may be transmitted at step 618 to the electronic device 150, another electronic device, and/or to other entities. Specific implementations of steps 616 and 618 for different applications are described in more detail below with respect to FIGS. 7, 8, and 9.

Figure 7:
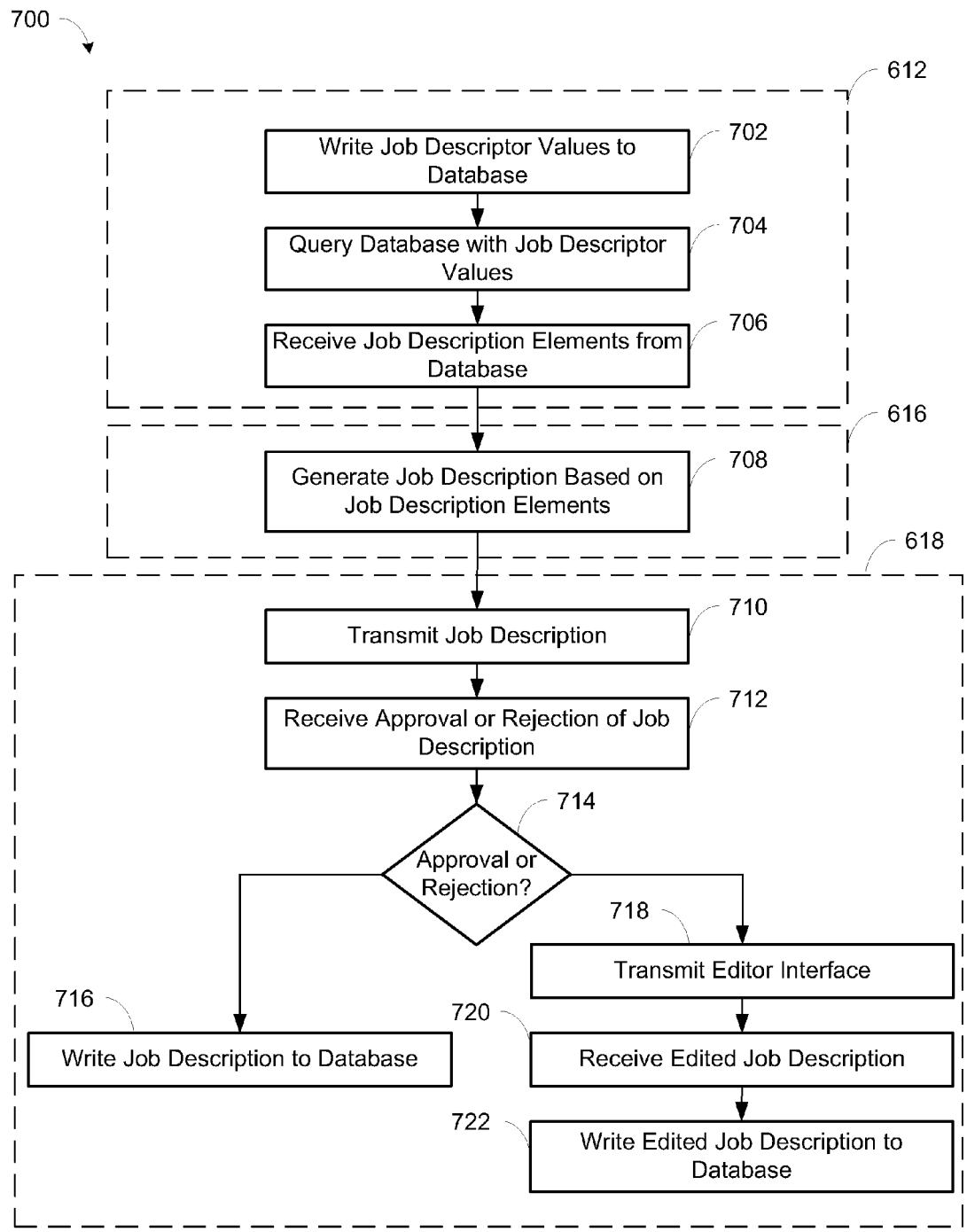
FIG. 7 is a flow diagram illustrating operations for generating job descriptions in conjunction with the operations illustrated in FIG. 6.

FIG. 7 is a flowchart of a method 700 for generating a job description using the system 100, including utilizing a manipulable graphical control element in a multi-dimensional graphical user input interface, in accordance with one or more principles of the invention. One or more steps of the method 700 may be implemented as part of steps in the method 600, as described further below. The job description generated by the method 700 may be automatically generated based on job description elements retrieved from the database 106, for example. The job description elements may be selected based on the values for each of the factors quantified by a user when a graphical control element is positioned in a graphical user input interface. The generated job description may be loaded to a job posting board for advertising an open position, for example.

Steps 602, 604, 606, 608, and/or 610 may be executed as described above with respect to FIG. 6. In this application for generating a job description, the factors retrieved at step 602 can relate to the specific roles and responsibilities for a particular job position. For example, FIGS. 3A-3C each illustrates two factors that are job descriptors for generating the job description: job type (ranging from bus boy to dishwasher) and restaurant classification (ranging from fine dining to casual dining). These two factors may be retrieved from the database 106 at step 602, and graphical user input interface screen data for generating a graphical user input interface 300 incorporating these factors may be transmitted to the electronic device 150 at step 608. The graphical user input interface 300 may also include a graphical control element 306. The selected position of the graphical control element 306 may be received at step 610, which quantifies values for each of the job descriptors.

Some or all of steps 702, 704, and 706 of FIG. 7 may be executed as part of step 612 for executing a database action, in response to receiving the selected position of the graphical control element 306. In particular, the values of the job descriptors may be written to the database 106 at step 702. The values of the job descriptors may be saved in the database 106 for future usage in generating the job description, particularly if there are more factors to be displayed than dimensions in a given graphical user input interface. The job descriptor values may be used to query the database 106 at step 704. Querying the database 106 with the job descriptor values can result in receiving job description elements from the database 106 at step 706. The job description elements can be utilized by the system 100 to compose a job description, and may include text, video, pictures, animation, etc. Particular job description elements in the database 106 can be included or excluded for utilization in generating a job description, based on the job descriptor values quantified by the position of the graphical control element 306.

Step 708 of FIG. 7 may be executed as part of step 616 for generating a database result, in response to executing the database action. In particular, the job description elements received at step 706 may be used to generate a job description. The generation of the job description at step 708 may be performed such that the job description elements are combined in a grammatically correct syntax, i.e., readable to humans. In some embodiments, step 708 also ensures that the generated job description complies with applicable employment laws, rules, and regulations. In certain embodiments, one or more job description elements can be weighted based on the importance and/or significance of particular job description elements in the generation of a job description.

Some or all of steps 710, 712, 714, 716, 718, 720, and 722 of FIG. 7 may be executed as part of step 618 for transmitting the database result, in response to generating the database result. In particular, at step 710, the job description generated at step 708 may be transmitted, such as to the electronic device 150 and/or to another entity. The generated job description may be reviewed and subsequently approved or rejected by a user. The approval or rejection of the job description may be received at step 712. If the job description is approved at step 714, then the job description can be written to the database 106 at step 716. However, if the job description is rejected at step 714, then the method 700 can continue to step 718. At step 718, an editor interface may be transmitted so that the user can edit the job description as desired. The editor interface may include, for example, a text box containing the generated job description with editing features to modify the content and/or layout of the job description. In certain embodiments, further graphical user input interfaces, text box queries, and/or other queries can be generated and transmitted to supplement and/or correct a generated job description. The edited job description can be received at step 720 and written to the database 106 at step 722. In some embodiments, the edited job description can be checked for grammatically correct syntax, spelling, etc. and for complying with applicable employment laws, rules, and regulations prior to being written to the database 106.

As an example, the position of the graphical control element 306 in the graphical user input interface 300 of FIG. 3A can be received. The quantified value of the job type descriptor may be more a busboy position with possible dishwasher responsibilities, and the quantified value of the restaurant classification descriptor may be more as fine dining than casual dining. The quantified values may be written to the database 106 at step 702, and used to query the database 106 at step 704. Job description elements corresponding to these quantified values may be received at step 706. At step 708, a job description may be generated based on these received job description elements. For the position of the graphical control element 306 in the graphical user input interface 300 of FIG. 3A, a job description generated at step 708 may include, for example:

Tasks
    Serve ice water, coffee, rolls, or butter to patrons.
    Set tables with clean linens, condiments, or other supplies.
    Maintain adequate supplies of items such as clean linens, silverware, glassware, dishes, or trays.
    Fill beverage or ice dispensers.
    Clean and polish counters, shelves, walls, furniture, or equipment in food service areas or other areas of restaurants and mop or vacuum floors.

Work Activities
    Load dishwasher
    Polish silverware by hand
    Understand government health, hotel or food service regulations
    Set or clear tables in dining areas Similarly, for FIG. 3B, the quantified value of the job type descriptor may be a dishwasher position and the quantified value of the restaurant classification descriptor may be a fine dining restaurant. The position of the graphical control element 306 in the graphical user input interface 300 of FIG. 3B may result in a job description generated at step 708 that includes, for example:

Tasks
    Wash fine dishes, glassware, utensils using dishwashers and/or by hand
    Place clean dishes, utensils, or cooking equipment in storage areas
    Maintain kitchen work areas, equipment, or utensils in clean and orderly condition
    Clean and polish counters, shelves, walls, furniture, or equipment in food service areas or other areas of restaurants and mop or vacuum floors.
    Clean garbage cans with water or steam
    Sort and remove trash, placing it in designated pickup and recycle areas.

Work Activities
    Wash crystal glasses by hand
    Polish silverware by hand
    Clean rooms or work areas
    Retrieve or place goods from/into storage For FIG. 3C, the quantified value of the job type descriptor may be more a busboy position with possible dishwasher responsibilities and the quantified value of the restaurant classification descriptor may be more a casual dining restaurant than a fine dining restaurant. For the position of the graphical control element 306 in the graphical user input interface 300 of FIG. 3C, a job description generated at step 708 may include, for example:

Tasks
    Wipe tables or seats with dampened cloths or replace dirty tablecloths.
    Scrape and stack dirty dishes and carry dishes and other tableware to kitchens for cleaning
    Clean up spilled food or drink or broken dishes and remove empty bottles and trash.

Perform serving, cleaning, or stocking duties in establishments, such as cafeterias or dining rooms, to facilitate customer service.

Stock cabinets or serving areas with condiments and refill condiment containers.

Carry food, dishes, trays, or silverware from kitchens or supply departments to serving counters.

Work Activities

Clear tables in dining areas

Figure 8:
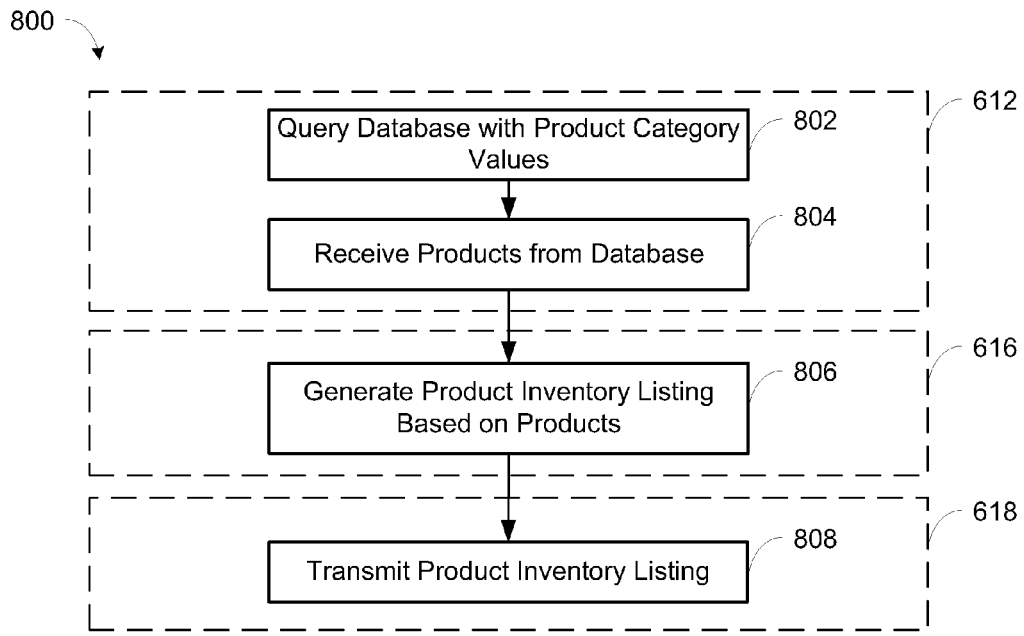
FIG. 8 is a flow diagram illustrating operations for sorting through and filtering a product inventory in conjunction with the operations illustrated in FIG. 6.

Store cleared items in the bus box or tray and take to the kitchen's dish washing area Clean rooms or work areas FIG. 8 is a flowchart of a method 800 for generating a listing of product inventory using the system 100, including utilizing a manipulable graphical control element in a multi-dimensional graphical user input interface, in accordance with one or more principles of the invention. One or more steps of the method 800 may be implemented as part of steps in the method 600, as described further below. The listing of product inventory generated by the method 800 may be automatically generated based on products retrieved from the database 106, for example. The products retrieved from the database may be based on the values for each of the factors quantified by a user when a graphical control element is positioned in a graphical user input interface. As a result, the method 800 can enable sorting and filtering of the product inventory through a faceted search.

Steps 602, 604, 606, 608, and/or 610 may be executed as described above with respect to FIG. 6. In this application for generating a listing of product inventory, the factors retrieved at step 602 can relate to particular product categories, attributes, and other factors. For example, FIGS. 4A-4C each illustrates two factors that are product categories for generating the listing of product inventory: eyeglasses type (ranging from hipster to frameless) and price (ranging from $89 to $499). These two factors may be retrieved from the database 106 at step 602, and graphical user input interface screen data for generating a graphical user input interface 400 incorporating these factors may be transmitted to the electronic device 150 at step 608. The graphical user input interface 400 may also include a graphical control element 406. The selected position of the graphical control element 406 may be received at step 610, which quantifies values for each of the product categories.

One or both of steps 802 and 804 of FIG. 8 may be executed as part of step 612 for executing a database action, in response to receiving the selected position of the graphical control element 406. In particular, the product category values may be used to query the database 106 at step 802. Querying the database 106 with the product category values can result in receiving products corresponding to the product category values from the database 106 at step 804. The products may be identified by Universal Product Code, item number, description, and/or other identifiers. The received products can be utilized by the system 100 to generate a listing of product inventory, such as at step 806. Step 806 of FIG. 8 may be executed as part of step 616 for generating a database result, in response to executing the database action. In particular, the products received at step 804 may be used to generate the listing of product inventory at step 806. The listing of the product inventory can be transmitted at step 808, which may be executed as part of step 618 for transmitting the database result, in response to generating the database result. The information in the listing of product inventory may include descriptions, images, animation, audio, and/or other information related to the products. In some embodiments, such information can be retrieved from the database 106 or another source at step 806 and/or step 808, based on the identifiers for the products.

In other embodiments, transmitting the database result at step 618 may include changing the shape and/or the data in the particular graphical user input interface. For example, an initial graphical user input interface for generating a listing of product inventory may include two dimensions corresponding to two factors that are product categories, e.g., adventure and historical. After the user positions the graphical control element within the initial graphical user input interface, graphical user input interface screen data for generating a subsequent graphical user input interface can be transmitted that is in a pentagon shape and includes five dimensions corresponding to five factors that are sub-categories, e.g., books, movies, games, hiking boots, and clothing. In this way, the user can more quickly retrieve the products they are most interested in.

In addition to generating the listing of product inventory, the position of the graphical control element 406 in FIGS. 4A-4C may also result in additional effects, such as highlighting the product category, listing the name of the product category, generating animation or sound, and/or other effects. In one embodiment, the effects may be implemented using an OnRollover button on a web page. When the graphical control element 406 is in a particular position, one or more effects may be triggered in response to the graphical control element 406 being in that particular position. The location of the effects may be in the same or different location as the position of the graphical control element 406.

For example, in FIG. 4A, the graphical control element 406 is positioned such that it is in the hipster category along the eyeglasses type axis. The product graphic element for this eyeglasses type may be highlighted (as denoted by the dashed box 410) and the name of the eyeglasses type ("Hipster") may be listed. The listing of product inventory that results from the position of the graphical control element 406 in FIG. 4A would be for eyeglasses in the hipster category with prices that are relatively expensive. Similarly, in FIG. 4B, the graphical control element 406 is positioned such that it is in the classic American category along the eyeglasses type axis. The product graphic element for this eyeglasses type may be highlighted (as denoted by the dashed box 412) and the name of the eyeglasses type ("Classic American") may be listed. The listing of product inventory resulting from this position of the graphical control element 406 would be for eyeglasses in the classic American category with prices that are relatively inexpensive. Finally, in FIG. 4C, the graphical control element 406 is positioned such that it is in the frameless category along the eyeglasses type axis. The product graphic element for this eyeglasses type may be highlighted (as denoted by the dashed box 414) and the name of the eyeglasses type ("Frameless") may be listed. The listing of product inventory resulting from this position of the graphical control element 406 would be for eyeglasses in the frameless category with prices that are mid-range. While FIGS. 4A-4C show a dashed box 410, 412, and 414 to denote that a particular eyeglass type has been selected and highlighted, such highlighting can also be implemented using black and white shading, color shading, solid lined boxes, or other graphical elements, animation, and/or sound.

Figure 9:
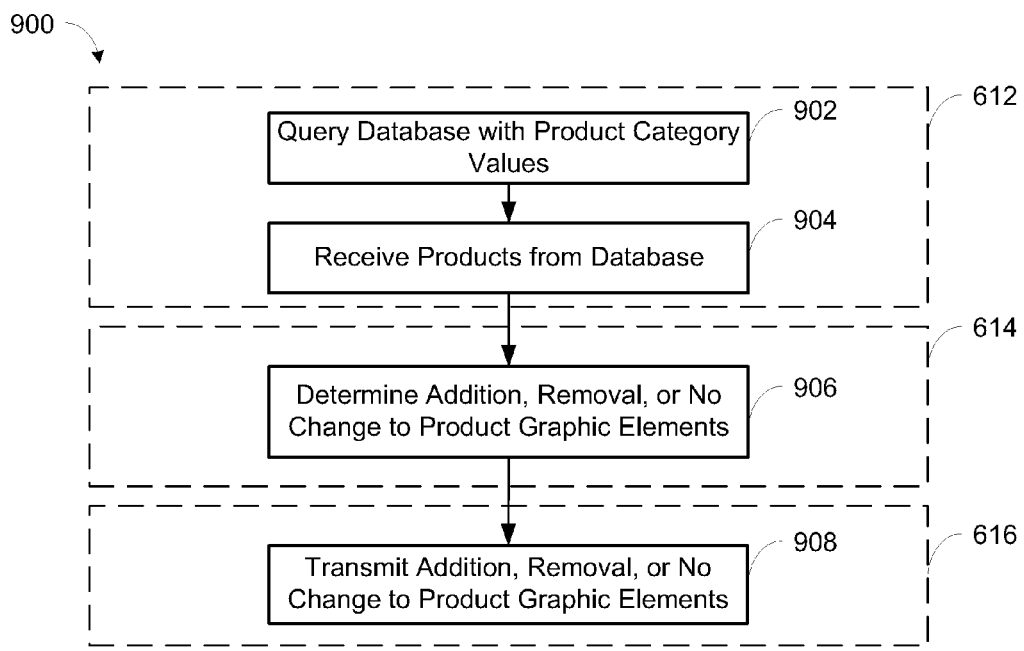
FIG. 9 is a flow diagram illustrating alternative operations for sorting through and filtering a product inventory in conjunction with the operations illustrated in FIG. 6.

FIG. 9 is a flowchart of a method 900 for adding, removing, or not changing product graphic elements in a graphical user input interface using the system 100, including utilizing a manipulable graphical control element in the graphical user input interface, in accordance with one or more principles of the invention. One or more steps of the method 800 may be implemented as part of steps in the method 600, as described further below. The addition, removal, or no change to product graphic elements may be performed based on the products retrieved from the database 106, for example. The products retrieved from the database may be based on the values for each of the factors quantified by a user when a graphical control element is positioned in a graphical user input interface. As a result, the method 900 can enable sorting and filtering of the product inventory through a faceted search. The method 900 may be executed in addition to or in lieu of the method 800 described above, in some embodiments.

Steps 602, 604, 606, 608, and/or 610 may be executed as described above with respect to FIG. 6. In this application for adding, removing, or not changing product graphic elements, the factors retrieved at step 602 can relate to particular product categories, attributes, and other factors. For example, FIGS. 5A-5C each illustrates two factors that are product categories for generating the listing of product inventory: eyeglasses type (ranging from hipster to frameless) and price (ranging from $89 to $499). These two factors may be retrieved from the database 106 at step 602, and graphical user input interface screen data for generating a graphical user input interface 500 incorporating these factors may be transmitted to the electronic device 150 at step 608. The graphical user input interface 500 may also include a graphical control element 506. The selected position of the graphical control element 506 may be received at step 610, which quantifies values for each of the product categories.

One or both of steps 902 and 904 of FIG. 9 may be executed as part of step 612 for executing a database action, in response to receiving the selected position of the graphical control element 506. In particular, the product category values may be used to query the database 106 at step 902. Querying the database 106 with the product category values can result in receiving products corresponding to the product category values from the database 106 at step 904. The products may be identified by Universal Product Code, item number, description, and/or other identifiers. The received products can be utilized by the system 100 to determine whether to add, remove, or not change product graphic elements from the graphical user input interface, such as at step 906. Step 906 of FIG. 9 may be executed as part of step 616 for generating a database result, in response to executing the database action. In particular, the products received at step 904 may be used to determine whether to add, remove, or not change any product graphic elements at step 806. The addition, removal, or no change to product graphic elements can be transmitted at step 908, which may be executed as part of step 618 for transmitting the database result, in response to generating the database result. Such addition, removal, or no change to product graphic elements can be transmitted at step 908 as graphical user input interface screen data, for example.

Figure 5C:
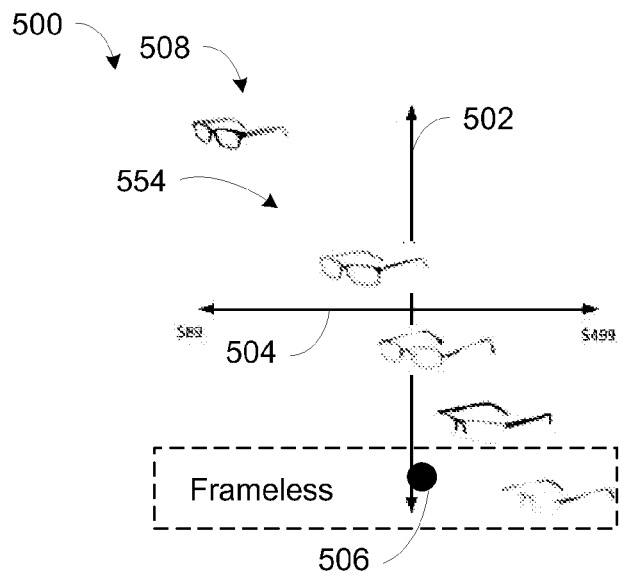

In FIGS. 5A-5C, the position of the graphical control element 506 may also result in additional effects, such as highlighting the product category and/or listing the name of the product category, similar to what is described above with respect to FIGS. 4A-4C. In one embodiment, the effects for highlighting, listing names, adding product graphic elements, and/or removing product graphic elements may be implemented using an OnRollover button on a web page. When the graphical control element 506 is in a particular position, one or more effects may be triggered in response to the graphical control element 506 being in that particular position. The location of the effects may be in the same or different location as the position of the graphical control element 506.

For example, in FIG. 5A, the graphical control element 506 is positioned such that it is in the hipster category along the eyeglasses type axis. As a result of the position of the graphical control element 506, it may be determined that the list of products in this price range (i.e., relatively expensive) may not include semi-rimless eyeglasses. Accordingly, the product graphic element for semi-rimless eyeglasses may be removed from the location 550 in the graphical user input interface 500 to indicate to the user that these types of eyeglasses are not available at this price range. Similarly, in FIG. 5B, the graphical control element 506 is placed so that inexpensive eyeglasses in the classic American category are selected. The position of the graphical control element 506 in FIG. 5B may determine an additional result that there are no semi-rimless eyeglasses or frameless eyeglasses available in this price range (i.e., inexpensive). Accordingly, the product graphic elements for these categories may be removed from the locations 550 and 552 in the graphical user input interface 500 to indicate to the user that these types of eyeglasses are not available at this price range. Finally, in FIG. 5C, the graphical control element 506 is placed such that mid-range price eyeglasses in the frameless category are selected. As a result of the position of the graphical control element 506, it may be determined that the list of products in this price range (i.e., mid-range) may not include classic American eyeglasses. Accordingly, the product graphic element for this type of eyeglasses may be removed from the location 554 in the graphical user input interface 500 to indicate to the user that these types of eyeglasses are not available at this price range.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method for interacting with a database using a multi-dimensional graphical user input interface, the method comprising:

transmitting from a processor to an electronic device graphical user input interface screen data for generating a graphical user input interface having a plurality of dimensions respectively corresponding to each of a plurality of factors comprising a plurality of job descriptors for generating a job description, wherein the graphical user input interface comprises a graphical control element manipulable to a plurality of positions in a construct defined by the plurality of dimensions such that values for each of the plurality of factors are simultaneously quantified at each of the plurality of positions;

receiving from the electronic device at the processor a selected position of the graphical control element in the construct, wherein the selected position is one of the plurality of positions in the construct and denotes the values that have been simultaneously quantified for each of the plurality of factors;

executing a database action, using the processor, based on the values for each of the plurality of factors, in response to receiving the selected position of the graphical control element in the construct, wherein executing the database action comprises:
  writing the values for each of the plurality of job descriptors to the database, using the processor;
  querying the database with the values for each of the plurality of job descriptors, using the processor; and
  receiving a plurality of job description elements from the database, using the processor, in response to querying the database;
generating the job description based on the plurality of job description elements, using the processor, in response to executing the database action; and
transmitting from the processor the job description, in response to generating the job description.

2. The method of claim 1:
wherein the graphical user input interface further comprises the plurality of factors.

3. The method of claim 1, further comprising:
receiving an approval or a rejection of the job description at the processor;
if the approval of the job description is received, writing the job description to the database, using the processor; and
if the rejection of the job description is received:
  transmitting from the processor an editor interface for allowing editing of the job description to produce an edited job description;
  receiving the edited job description at the processor; and
  writing the edited job description to the database, using the processor.

4. The method of claim 1:
further comprising:
  transmitting from the processor to the electronic device the plurality of factors; and
  receiving from the electronic device at the processor a selection of a subset of the plurality of factors;
wherein generating and transmitting the graphical user input interface comprises generating and transmitting from the processor to the electronic device the graphical user input interface having the plurality of dimensions respectively corresponding to each of the subset of the plurality of factors, in response to receiving the selection of the subset of the plurality of factors.

5. A system for user interaction with a database using a multi-dimensional graphical user input interface, the system comprising:
a processor in communication with a network;
a memory in communication with the processor, the memory for storing:
  the database comprising a plurality of factors;
  a GUI generation engine for:
    transmitting to an electronic device graphical user input interface screen data for generating a graphical user input interface having a plurality of dimensions respectively corresponding to each of the plurality of factors comprising a plurality of job descriptors for generating a job description, wherein the graphical user input interface comprises a graphical control element manipulable to a plurality of positions in a construct defined by the plurality of dimensions such that values for each of the plurality of factors are simultaneously quantified at each of the plurality of positions; and
    receiving from the electronic device a selected position of the graphical control element in the construct, wherein the selected position is one of the plurality of positions in the construct and denotes the values that have been simultaneously quantified for each of the plurality of factors; and
  a database interaction engine for:
    executing a database action, based on the values for each of the plurality of factors, in response to receiving the selected position of the graphical control element in the construct, wherein executing the database action comprises:
      writing the values for each of the plurality of job descriptors to the database;
      querying the database with the values for each of the plurality of job descriptors; and
      receiving a plurality of job description elements from the database, in response to querying the database;
    generating the job description based on the plurality of job description elements, in response to executing the database action; and
    transmitting the job description, in response to generating the job description.

6. The system of claim 5, wherein:
the graphical user input interface further comprises the plurality of factors.

7. The system of claim 5, wherein the database interaction engine is further for:
receiving an approval or a rejection of the job description;
if the approval of the job description is received, writing the job description to the database; and
if the rejection of the job description is received:
  transmitting an editor interface for allowing editing of the job description to produce an edited job description;
  receiving the edited job description; and
  writing the edited job description to the database.

8. The system of claim 5:
wherein the database interaction engine is further for:
  transmitting to the electronic device the plurality of factors; and
  receiving from the electronic device a selection of a subset of the plurality of factors; and
wherein the GUI generation engine generates and transmits the graphical user input interface by generating and transmitting to the electronic device the graphical user input interface having the plurality of dimensions respectively corresponding to each of the subset of the plurality of factors, in response to receiving the selection of the subset of the plurality of factors.

9. A method for interacting with a database using a multi-dimensional graphical user input interface, the method comprising:
transmitting from a processor to an electronic device graphical user input interface screen data for generating a graphical user input interface having a plurality of dimensions respectively corresponding to each of a plurality of factors comprising a plurality of product categories for generating a listing of product inventory, wherein the graphical user input interface comprises a graphical control element manipulable to a plurality of positions in a construct defined by the plurality of dimensions such that values for each of the plurality of factors are simultaneously quantified at each of the plurality of positions;
receiving from the electronic device at the processor a selected position of the graphical control element in the construct, wherein the selected position is one of the plurality of positions in the construct and denotes the values that have been simultaneously quantified for each of the plurality of factors;

executing a database action, using the processor, based on the values for each of the plurality of factors, in response to receiving the selected position of the graphical control element in the construct, wherein executing the database action comprises:

querying the database with the values for each of the plurality of product categories, using the processor; and receiving one or more products of the product inventory from the database, using the processor, in response to querying the database;

generating the listing of product inventory based on the one or more products of the product inventory, using the processor, in response to executing the database action; and transmitting from the processor the listing of product inventory, in response to generating the product inventory.

10. The method of claim 9:

further comprising retrieving from the database at the processor the plurality of factors; and wherein the graphical user input interface further comprises the plurality of factors.

11. The method of claim 9, wherein:

the graphical user input interface further comprises a plurality of product graphic elements corresponding to the plurality of product categories;

executing the database action comprises:

querying the database with the values for each of the plurality of product categories, using the processor; and receiving one or more products of the product inventory from the database, using the processor, in response to querying the database;

generating the database result comprises determining whether to add, remove, or not change one or more of the plurality of product graphic elements of the graphical user input interface, using the processor, based on the one or more products of the product inventory; and transmitting the database result comprises transmitting from the processor the addition, the removal, or no change to one or more of the plurality of product graphic elements of the graphical user input interface, using the processor, in response to determining whether to add, remove, or not change one or more of the plurality of product graphic elements of the graphical user input interface.

12. The method of claim 9:

further comprising:

transmitting from the processor to the electronic device the plurality of factors; and receiving from the electronic device at the processor a selection of a subset of the plurality of factors;

wherein generating and transmitting the graphical user input interface comprises generating and transmitting from the processor to the electronic device the graphical user input interface having the plurality of dimensions respectively corresponding to each of the subset of the plurality of factors, in response to receiving the selection of the subset of the plurality of factors.

13. A system for user interaction with a database using a multi-dimensional graphical user input interface, the system comprising:

a processor in communication with a network;

a memory in communication with the processor, the memory for storing:

the database comprising a plurality of factors;

a GUI generation engine for:

transmitting to an electronic device graphical user input interface screen data for generating a graphical user input interface having a plurality of dimensions respectively corresponding to each of the plurality of factors comprising a plurality of product categories for generating a listing of product inventory, wherein the graphical user input interface comprises a graphical control element manipulable to a plurality of positions in a construct defined by the plurality of dimensions such that values for each of the plurality of factors are simultaneously quantified at each of the plurality of positions; and receiving from the electronic device a selected position of the graphical control element in the construct, wherein the selected position is one of the plurality of positions in the construct and denotes the values that have been simultaneously quantified for each of the plurality of factors; and a database interaction engine for:

executing a database action, based on the values for each of the plurality of factors, in response to receiving the selected position of the graphical control element in the construct, wherein executing the database action comprises:

querying the database with the values for each of the plurality of product categories; and receiving one or more products of the product inventory from the database, in response to querying the database;

generating the listing of product inventory based on the one or more products of the product inventory, in response to executing the database action; and transmitting the listing of product inventory, in response to generating the product inventory.

14. The system of claim 13, wherein:

the GUI generation engine is further for retrieving from the database the plurality of factors; and the graphical user input interface further comprises the plurality of factors.

15. The system of claim 13, wherein:

the graphical user input interface further comprises a plurality of product graphic elements corresponding to the plurality of product categories;

the database interaction engine executes the database action by:

querying the database with the values for each of the plurality of product categories; and receiving one or more products of the product inventory from the database, in response to querying the database;

the database interaction engine generates the database result by determining whether to add, remove, or not change one or more of the plurality of product graphic elements of the graphical user input interface, based on the one or more products of the product inventory; and the database interaction engine transmits the database result by directing the GUI generation engine to transmit the addition, the removal, or no change to one or more of the plurality of product graphic elements of the graphical user input interface, in response to determining whether to add, remove, or not change one or more of the plurality of product graphic elements of the graphical user input interface.

16. The system of claim 13:
wherein the database interaction engine is further for:
- transmitting to the electronic device the plurality of factors; and
- receiving from the electronic device a selection of a subset of the plurality of factors; and wherein the GUI generation engine generates and transmits the graphical user input interface by generating and transmitting to the electronic device the graphical user input interface having the plurality of dimensions respectively corresponding to each of the subset of the plurality of factors, in response to receiving the selection of the subset of the plurality of factors.

\* \* \* \* \*